(12) United States Patent
Chen et al.

(10) Patent No.: US 10,745,290 B2
(45) Date of Patent: Aug. 18, 2020

(54) DEVICE AND METHOD FOR PRODUCING HIGH-PURITY NANO MOLYBDENUM TRIOXIDE

(71) Applicant: HUBEI ZHONG'AO NANOTECH CO., LTD, Guangshui (CN)

(72) Inventors: Fangwu Chen, Guangshui (CN); Zheng Sun, Guangshui (CN); Zhen Chen, Guangshui (CN); Luocheng Chen, Guangshui (CN); Yi Dan, Guangshui (CN); Hongbo Chen, Guangshui (CN); Qingbing Zeng, Guangshui (CN)

(*) Notice: Subject to any disclaimer, the term of this patent is extended or adjusted under 35 U.S.C. 154(b) by 248 days.

(21) Appl. No.: 15/996,490

(22) Filed: Jun. 3, 2018

(65) Prior Publication Data

US 2018/0346344 A1 Dec. 6, 2018

Related U.S. Application Data

(63) Continuation of application No. PCT/CN2016/108351, filed on Dec. 2, 2016.

(30) Foreign Application Priority Data

Dec. 4, 2015 (CN) .......................... 2015 1 0891877

(51) Int. Cl.
*B01J 19/00* (2006.01)
*B22F 9/12* (2006.01)
(Continued)

(52) U.S. Cl.
CPC ............... *C01G 39/02* (2013.01); *B01D 7/00* (2013.01); *B22F 9/12* (2013.01); *B82Y 30/00* (2013.01);
(Continued)

(58) Field of Classification Search
CPC .................................. C01G 39/02; B22F 9/12
(Continued)

(56) References Cited

U.S. PATENT DOCUMENTS 4,551,313 A * 11/1985 Sabacky ................ C01G 39/02
423/53
4,986,347 A * 1/1991 Hirth ........................ F28G 3/08
165/94
(Continued)

FOREIGN PATENT DOCUMENTS

CN 102603005 A 7/2012
CN 202988768 U 6/2013
(Continued)

OTHER PUBLICATIONS

International Search Report of PCT/CN2016/108351 dated Mar. 7, 2017.

*Primary Examiner* — Jennifer A Leung
(74) *Attorney, Agent, or Firm* — Erson IP (Nelson IP)

(57) ABSTRACT

A device and a method for producing high-purity nano molybdenum trioxide are provided. The device comprises a raw material bin (1), a feeding machine (2), a subliming furnace (7), a first vent tube (24), a second vent tube (25), a spraying device (23) and a filtering assembly. The sublimated molybdenum trioxide is cooled with clean and dehumidified air so as to finally obtain the nano molybdenum trioxide, and the recycling mode is reliable, pollution-free and high in efficiency.

8 Claims, 1 Drawing Sheet

(51) Int. Cl.
    *C01G 39/02* (2006.01)
    *B82Y 30/00* (2011.01)
    *B01D 7/00* (2006.01)
    *F27B 15/08* (2006.01)
    *F27B 15/09* (2006.01)
    *F27D 15/02* (2006.01)
    *B82Y 40/00* (2011.01)
    *F27D 99/00* (2010.01)

(52) U.S. Cl.
    CPC .............. *F27B 15/08* (2013.01); *F27B 15/09* (2013.01); *F27D 15/0206* (2013.01); *B01J 2219/0013* (2013.01); *B01J 2219/00123* (2013.01); *B82Y 40/00* (2013.01); *C01P 2004/64* (2013.01); *C01P 2006/80* (2013.01); *F27D 2099/0086* (2013.01); *Y10S 266/905* (2013.01)

(58) Field of Classification Search
    USPC .............................................. 422/244; 75/367
    See application file for complete search history.

(56) References Cited

U.S. PATENT DOCUMENTS

| | | |
|---|---|---|
| 6,468,497 B1 | 10/2002 | Khan et al. |
| 7,413,724 B2 | 8/2008 | Khan et al. |
| 7,438,888 B2 | 10/2008 | Khan et al. |
| 7,622,098 B2 | 11/2009 | Taube et al. |
| 7,749,463 B2 | 7/2010 | Khan et al. |
| 7,829,060 B2 | 11/2010 | Taube et al. |
| 7,854,908 B2 | 12/2010 | Hnat |
| 2002/0192149 A1 | 12/2002 | Khan et al. |
| 2002/0197203 A1 | 12/2002 | Khan et al. |
| 2003/0003034 A1 | 1/2003 | Khan et al. |
| 2003/0007925 A1 | 1/2003 | Khan et al. |
| 2006/0120950 A1 | 6/2006 | Khan et al. |
| 2009/0136416 A1 | 5/2009 | Taube et al. |
| 2009/0142597 A1 | 6/2009 | Taube et al. |
| 2010/0047141 A1 | 2/2010 | Hnat |

FOREIGN PATENT DOCUMENTS

| | | | |
|---|---|---|---|
| CN | 103449523 A | 12/2013 | |
| CN | 105347400 A | 2/2016 | |
| GB | 910361 A | * 11/1962 | ............. C01G 39/02 |

* cited by examiner

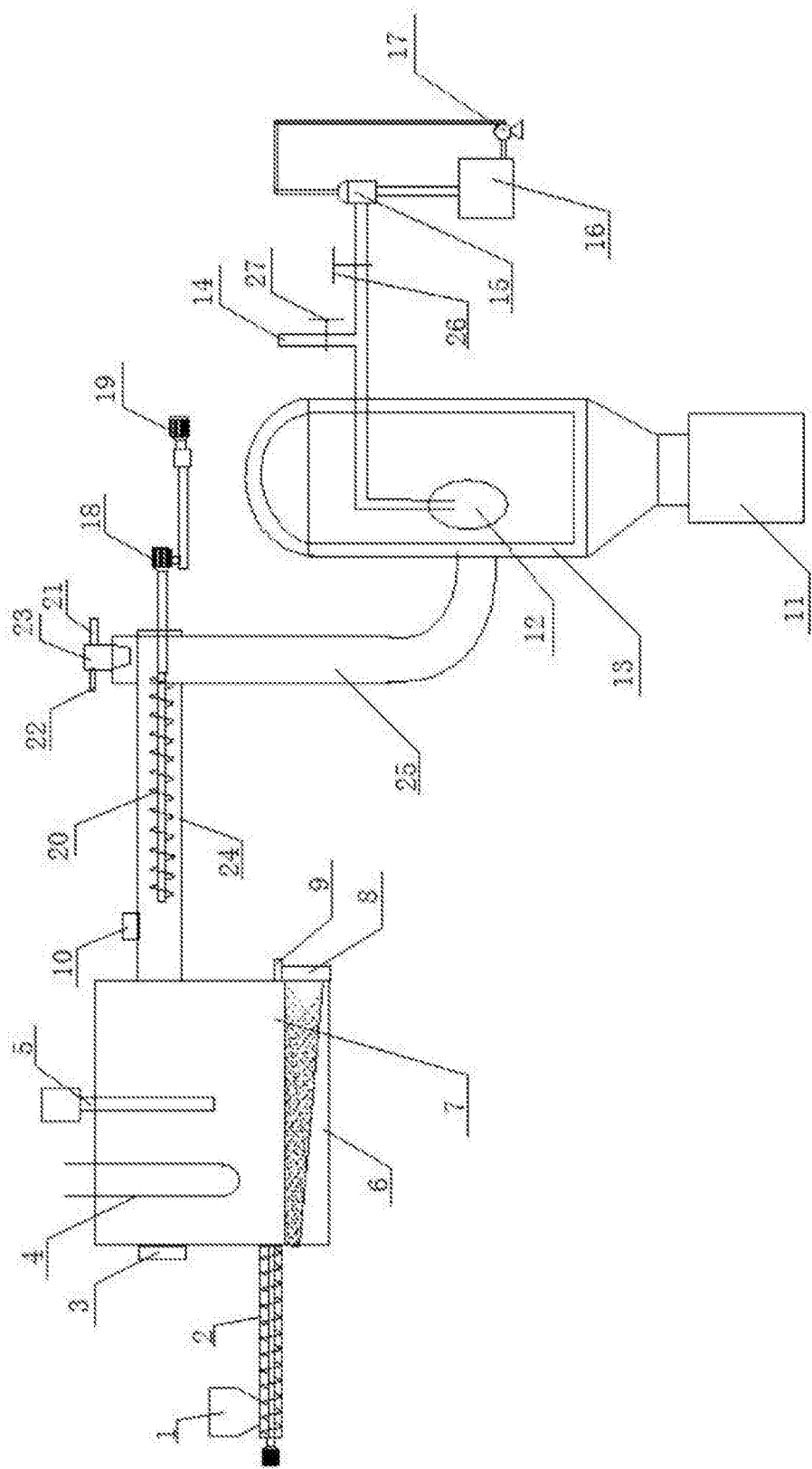

DEVICE AND METHOD FOR PRODUCING HIGH-PURITY NANO MOLYBDENUM TRIOXIDE

CROSS-REFERENCE TO RELATED APPLICATIONS

This application is a continuation of International Patent Application No. PCT/CN2016/108351 with a filing date of Dec. 2, 2016, designating the United States, now pending, and further claims priority to Chinese Patent Application No. 2015/10891877.9 with a filing date of Dec. 4, 2015, designating the United States, now pending. The content of the aforementioned applications, including any intervening amendments thereto, are incorporated herein by reference.

TECHNICAL FIELD

The present invention relates to a device and a method for producing high-purity nano molybdenum trioxide.

BACKGROUND OF THE PRESENT INVENTION

In the industry, molybdenum trioxide is prepared by roasting ammonium molybdate, or high-purity molybdenum trioxide is prepared by leaching molybdenum concentrate by oxygenating with acids and bases at high pressure by virtue of a chemical method, separating the impurities to prepare molybdate, and decomposing molybdate. With the continuous development of material science and application technologies, the problems of molybdenum trioxide prepared with the above method, such as coarse particles, agglomeration and low purity of molybdenum trioxide, could not be solved well. High-activity molybdenum trioxide is applied to the field of catalysts, which not only has specific requirements for impurities and particle size distribution of molybdenum trioxide, but also has specific requirements for reaction characteristics of molybdenum trioxide in solutions.

U.S. Pat. No. 4,551,313 discloses a rapid sublimation method of molybdenum trioxide having slag inclusion compositions (silicon, aluminum and heavy metal), which only solves the separation problem of molybdenum trioxide from impurities and improves the purities of molybdenum trioxide; and the particle size of molybdenum trioxide is above a micron size.

U.S. Pat. No. 6,468,497 discloses a production method of nano molybdenum trioxide, with the core of quenching molybdenum trioxide with liquid nitrogen (48° C.) and obtaining nano stripe-shaped molybdenum trioxide with a length of about 80-90 nm and a diameter of about 20-30 nm.

With the above methods, nano molybdenum trioxide could be prepared apparently, but the following problems exist: the production cost is high, the product is difficult to achieve the large-scale industrial application and promotion, and in addition, the product is in a shape of a needle, but in a special industry, such as a specific wear-resistant agent in high-level lubricating oil, the nano molybdenum trioxide is required to be spherical. Therefore, it is especially important to design an automatic, continuous, safe and reliable device and method of nano molybdenum trioxide having low equipment investment, simple process operation and low product cost.

SUMMARY OF PRESENT INVENTION

The present invention proposes a device for producing high-purity nano molybdenum trioxide. Nano molybdenum trioxide is finally obtained by sublimating molybdenum trioxide, which is reliable and pollution-free in recovery mode and high in recovery efficiency.

The technical solution of the present invention is achieved as follows:

A device for producing high-purity nano molybdenum trioxide comprises a raw material bin 1, a feeding machine 2, a subliming furnace 7, a first vent tube 24, a second vent tube 25, a spraying device 23 and a filtering assembly 12, wherein the raw material bin 1 is in communication with the feeding machine 2; the feeding machine 2 is in communication with the lower side of the subliming furnace 7; the upper side of the subliming furnace 7 is in communication with the horizontally arranged first vent tube 24; the tail end of the first vent tube 24 is in communication with the vertically arranged second vent tube 25; the second vent tube 25 is in communication with a recoverer 13; a finished product bin 11 is arranged below the recoverer 13; the filtering assembly 12 is arranged at a part, in the recoverer 13, in communication with the second vent tube 25; the spraying device 23 is arranged at the connecting part of the first vent tube 24 and the second vent tube 25; the spraying device 23 is connected to a dispersing agent port 21 and a compressed air port 22; the nozzle direction of the spraying device 23 is coaxial with the axis of the second vent tube 25; and a clean air inlet 10 is provided in the first vent tube 24.

Further, a stirring shaft 20 is horizontally arranged in the first vent tube 24, the tail end of the stirring shaft 20 is connected to a rotary motor 18, the rotary motor 18 is installed on a drive rod of a propulsion motor 19, and the propulsion motor 19 pushes the rotary motor 18 to move back and forth in a linear direction in which the first vent tube 24 is located.

Further, the recoverer 13 is connected to a water jet pump 15 through one end of a pipeline, the other end of the pipeline is arranged in the filtering assembly 12, the water jet pump 15 is connected to a deionized water pool 16, the deionized water pool is connected to the water jet pump 15 through a circulation pipeline, and a circulating pump 17 is arranged on the circulation pipeline.

Further, a first valve 26 is arranged on a pipeline between the recoverer 13 and the water jet pump 15, a compressed air port 14 is formed between the first valve 26 and the recoverer 13, and a second valve 27 is arranged on the compressed air port 14.

Further, the filtering assembly 12 comprises a sealing body composed of a hollow sealed metal interception film 2; a layer of high-temperature resistant filter cloth 1 is coated outside the metal interception film 2 to form an interlayer; nano molybdenum trioxide 3 is placed in the interlayer between the metal interception film 2 and the high-temperature resistant filter cloth 1; and an interior of the metal interception film 2 is connected to the compressed air port 14 with the second valve 27 through a pipeline.

Further, a bottom 6 of the subliming furnace 7 is sloped, one end located at the connecting part of the feeding machine 2 is higher, and a liquid outlet 8 is formed at a lower end of the bottom 6.

Further, a compressed air port 9 is formed at a lower side of the subliming furnace 7.

Further, a peephole 3 is formed in a side wall of the subliming furnace 7 and is in the same horizontal line together with the first vent tube 24.

A method for producing high-purity nano molybdenum trioxide comprises the steps of taking pure molybdenum trioxide as a raw material, delivering the raw material into the subliming furnace 7 through the feeding machine 2, controlling a temperature of the subliming furnace 7 at 1100° C. to 1160° C. and subliming the raw material, starting a propulsion motor 19 and a rotary motor 18, feeding clear air with a water content less than 30% from the clean air inlet 10 at 10° C. to 18° C. to guarantee the temperature of the first vent tube 24 at 75° C. to 85° C., starting the spraying device 23 to eject the spray with a dispersing agent, spraying the raw material into the recoverer for filtering and collecting the raw material, and filtering the air through the filter and entering the raw material into the deionized water pool 16.

Further, when the water content of the compressed air accessed from the compressed air port 9 at a lower side of the subliming furnace 7 is less than 30%, the air is supplemented, thereby increasing the sublimation amount of molybdenum trioxide, wherein the air temperature is 15° C. to 18° C., the humidity is 28-35%, and the pressure is 0.75 Mpa to 0.8 Mpa.

Nano molybdenum trioxide prepared in the solution is spherical: particle size≤100 nm, degree of sphericity≥0.92, specific surface area≥40 m2/g.

Pure molybdenum trioxide described in the present invention refers to high-purity molybdenum trioxide prepared by carrying out thermal decomposition with molybdic acid and ammonium molybdate, oxidizing pure molybdenum powder or other methods, and the total amount of impurities is not greater than 0.02% (weight).

The present invention has the following beneficial effects:

1) The subliming furnace is operated reliably.

The subliming furnace in the present invention takes a common iron plate as a housing; a high-quality refractory brick is lined; a heating element is a U-shaped silicon molybdenum rod; and the temperature is regulated and controlled by a computer. The subliming furnace could be operated for above 2000 h continuously; and vulnerable elements are replaced regularly and initiatively. A molybdenum trioxide bath at the bottom is discharged once a year; a heating power is turned off while planned shutdown; and the liquid outlet 8 is opened to discharge liquid molybdenum trioxide (including other impurities having high melting point or big specific gravity) for cooling in a sand box, and molybdenum trioxide is sold as molybdenum iron. Due to the obvious reasonable structure and design, it is superior to structures of all existing reported heating furnaces. The disadvantage is that the overall leakproofness of the furnace body is not ideal, and such defect is solved through sublimation and negative pressure operation.

2) The rotary motor and the propulsion motor are frequency modulation motors, and a working element driven by the rotary motor and the propulsion motor enables cooling air to mix with molybdenum trioxide gas (including a little air) to achieve a purpose of instantaneous cooling, thereby achieving the nanosizing of molybdenum trioxide powder.

3) Components that intercept the recovery products are divided into multiple groups; a vacuum valve in one of the groups is closed regularly, and a purge air valve is turned on to purge. Manual/automatic interlocking is set and self-control is carried out with an impulse controller while automatic control. The recovery products in the groups are successively purged alternately.

4) The dispersing agent is added at a low temperature section in the process, thereby achieving the uniform distribution effect of the dispersing agent, and further improving the anti-polymerization effect.

5) A vacuum unit is ejected with deionized water; the vacuum sucking rate of the vacuum unit ensures the needs for removal of sublimated molybdenum trioxide, addition of the cooling air, and overall material transportation of the system. Meanwhile, a little nano molybdenum trioxide leaked by an interception unit is recovered. In a deionized circulating pool, molybdenum element is adsorbed and recovered with special resin once a year. Due to the overall negative pressure operation of the system, the environment is friendly, and the recovery rate is high.

6) Automatic and scale production is achieved: since the automatic control (or the computer) is achieved due to cooling of each unit in the present invention, a product tank is removed while it is collected fully and is replaced with a new tank as long as materials are provided in a raw material hopper, thereby achieving the large-scale continuous production process. Therefore, the device has incomparable superiority of preparing nano molybdenum trioxide with existing sublimation methods. One production line in this method has an annual output of about 50 t of nano molybdenum trioxide.

7) The product achieves the nanosized particle size and spherical appearance: the present invention prepares nano molybdenum trioxide by quenching treated cheap air; particle size≤100 nm, specific surface area 40 m2/g, and degree of sphericity≥0.92.

The present invention has the beneficial effects that: the near-spherical nano molybdenum trioxide is finally obtained by subliming molybdenum trioxide, and the recycling mode is reliable, pollution-free and high in efficiency.

DESCRIPTION OF THE DRAWINGS

To describe the technical solution in embodiments of the present invention or a prior art more clearly, drawings to be used in the description of the embodiments or the prior art are illustrated below simply. Apparently, the following drawings in the description are only some embodiments of the present invention, and those skilled in the art could also obtain other drawings according to these drawings, without contributing creative labor.

FIG. 1 is a structural schematic diagram of the present invention.

DETAILED DESCRIPTION OF PREFERRED EMBODIMENTS

The technical solution in the embodiments of the present invention is described below clearly and completely in combination with the drawings of the embodiments of the present invention. Apparently, the described embodiments are only a part of embodiments of the present invention, rather than all embodiments. Based on the embodiment of the present invention, all other embodiments obtained by those skilled in the art without contributing creative labor belong to the protection scope of the present invention.

A device for producing high-purity nano molybdenum trioxide as shown in FIG. 1 comprises a raw material bin 1, a feeding machine 2, a subliming furnace 7, a first vent tube 24, a second vent tube 25, a spraying device 23 and a filtering assembly 12, wherein the raw material bin 1 is in communication with the feeding machine 2; the feeding machine 2 is in communication with the lower side of the subliming furnace 7; the upper side of the subliming furnace 7 is in communication with the horizontally arranged first vent tube 24; the tail end of the first vent tube 24 is in communication with the vertically arranged second vent tube 25; the second vent tube 25 is in communication with a recoverer 13; a finished product bin 11 is arranged below the recoverer 13; the filtering assembly 12 is arranged at a part, in the recoverer 13, in communication with the second vent tube 25; the spraying device 23 is arranged at the connecting part of the first vent tube 24 and the second vent tube 25; the spraying device 23 is connected to a dispersing agent port 21 and a compressed air port 22; the nozzle direction of the spraying device 23 is coaxial with the axis of the second vent tube 25; and a clean air inlet 10 is provided in the first vent tube 24.

In the present embodiment, a stirring device 20 is horizontally arranged in the first vent tube 24; the tail end of the stirring device 20 is connected to a rotary motor 18; the rotary motor 18 is installed on a drive rod of a reciprocating motor 19; and the reciprocating motor 19 pushes the rotary motor 18 to move back and forth in a linear direction in which the first vent tube 24 is located, thereby guaranteeing that molybdenum trioxide is anti-blocking and powdery in the first vent tube 24.

The recoverer 13 is connected to a water jet pump 15 through one end of a pipeline; the other end of the pipeline is arranged in the filtering assembly 12; the water jet pump 15 is connected to a deionized water pool 16; the deionized water pool is connected to the water jet pump 15 through a circulation pipeline; and a circulating pump 17 is arranged on the circulation pipeline. A first valve 26 is arranged on a pipeline between the recoverer 13 and the water jet pump 15; a compressed air port 14 is formed between the first valve 26 and the recoverer 13, and a second valve 27 is arranged on the compressed air port 14. The filtering assembly 12 comprises a sealing body composed of a hollow sealed metal interception film; a layer of high-temperature resistant filter cloth is coated outside the metal interception film to form an interlayer; nano molybdenum trioxide is placed in the interlayer between the metal interception film and the high-temperature resistant filter cloth; and an interior of the metal interception film is connected to the compressed air port 14 with the second valve 27 through a pipeline.

In the solution, the spraying device 23 sprays mist with a dispersing agent to spray powdery molybdenum trioxide by cooperating with the raw material, and molybdenum trioxide enters into the recoverer. Molybdenum trioxide is filtered by the filtering assembly 12 and collected in finished product bin 11; air enters into the water jet pump 15 from the pipeline and is dissolved by ejecting, and part of molybdenum trioxide penetrated is dissolved to enter into the deionized water pool 16. After production for a period, the first valve 26 is turned off; the second valve 27 is turned on; the compressed air is accessed and enters into the hollow metal interception film of the filtering assembly 12; molybdenum trioxide attached to the high-temperature filter cloth is blown off and enters into the finished product bin 11; and the filtering assembly could be reused.

In the present embodiment, a bottom 6 of the subliming furnace 7 is sloped; one end located at the connecting part of the feeding machine 2 is higher; and a liquid outlet 8 is formed at a lower end of the bottom 6. A compressed air port 9 is formed at a lower side of the subliming furnace 7. Meanwhile, a silicon molybdenum rod 4 and a temperature-controlled thermal resistance 5 are arranged in the subliming furnace 7, which could adjust the temperature in a furnace body for real-time detection and temperature control.

A peephole 3 is formed in a side wall of the subliming furnace 7 and is in the same horizontal line together with the first vent tube 24, so as to observe the condition in the subliming furnace 7 and the first vent tube 24.

A method for producing high-purity nano molybdenum trioxide comprises the steps of taking pure molybdenum trioxide as a raw material, delivering the raw material into the subliming furnace 7 through the feeding machine 2, controlling a temperature of the subliming furnace 7 at 1100° C. to 1160° C. and subliming the raw material, starting a propulsion motor 19 and a rotary motor 18, accessing clear air with a water content less than 30% from the clean air inlet 10 at 10° C. to 18° C. to guarantee the temperature of the first vent tube 24 at 75° C. to 85° C., starting the spraying device 23 to eject the spray with dispersing agent, spraying the raw material into the recoverer for filtering and collecting the raw material, and filtering the air through the filter and entering the raw material into the deionized water pool 16. When the water content of the compressed air accessed from the compressed air port 9 at a lower side of the subliming furnace 7 is less than 30%, the air is supplemented, thereby increasing the sublimation amount of molybdenum trioxide, wherein the air temperature is 15° C. to 18° C., the humidity is 28-35%, and the pressure is 0.75 Mpa to 0.8 Mpa.

The above only describes preferred embodiments of the present invention, and is not used for limiting the present invention. Any amendment, equivalent replacement, improvement, etc. made within the spirit and principle of the present invention should be included in the protection scope of the present invention.

We claim:

1. A device for producing high-purity nano molybdenum trioxide, comprising a raw material bin (1), a feeding machine (2), a subliming furnace (7), a horizontally arranged first vent tube (24), a vertically arranged second vent tube (25), a spraying device (23) and a filtering assembly (12), wherein the raw material bin (1) is in communication with the feeding machine (2); the feeding machine (2) is in communication with a lower side of the subliming furnace (7); an upper side of the subliming furnace (7) is in communication with the horizontally arranged first vent tube (24); a tail end of the first vent tube (24) is in communication with the vertically arranged second vent tube (25); the second vent tube (25) is in communication with a recoverer (13); a finished product bin (11) is arranged below the recoverer (13); the filtering assembly (12) is arranged at a part, in the recoverer (13), in communication with the second vent tube (25); the spraying device (23) is arranged at a connecting part of the first vent tube (24) and the second vent tube (25); the spraying device (23) is connected to a dispersing agent port (21) and a compressed air port (22); the direction of a nozzle of the spraying device (23) is coaxial with the axis of the second vent tube (25); and a clean air inlet (10) is provided in the first vent tube (24).

2. The device for producing high-purity nano molybdenum trioxide according to claim 1, wherein a stirring device (20) is horizontally arranged in the first vent tube (24), a tail end of the stirring device (20) is connected to a rotary motor (18), the rotary motor (18) is installed on a drive rod of a propulsion motor (19), and the propulsion motor (19) pushes the rotary motor (18) to move back and forth in a linear direction in which the first vent tube (24) is located.

3. The device for producing high-purity nano molybdenum trioxide according to claim 1, wherein the recoverer (13) is connected to a water jet pump (15) through one end of a pipeline, the other end of the pipeline is arranged in the filtering assembly (12), the water jet pump (15) is connected to a deionized water pool (16), the deionized water pool is connected to the water jet pump (15) through a circulation pipeline, and a circulating pump (17) is arranged on the circulation pipeline.

4. The device for producing high-purity nano molybdenum trioxide according to claim 3, wherein a first valve (26) is arranged on a pipeline between the recoverer (13) and the water jet pump (15); a compressed air port (14) is formed between the first valve (26) and the recoverer (13); and a second valve (27) is arranged on the compressed air port (14).

5. The device for producing high-purity nano molybdenum trioxide according to claim 4, wherein the filtering assembly (12) comprises a sealing body composed of a hollow sealed metal interception film; a layer of high-temperature resistant filter cloth is coated outside the metal interception film to form an interlayer; nano molybdenum trioxide is placed in the interlayer between the metal interception film and the high-temperature resistant filter cloth; and an interior of the metal interception film is connected to the compressed air port (14) with the second valve (27) through a pipeline.

6. The device for producing high-purity nano molybdenum trioxide according to claim 1, wherein a bottom (6) of the subliming furnace (7) is sloped; one end located at a connecting part of the feeding machine (2) is higher; and a liquid outlet (8) is formed at a lower end of the bottom (6).

7. The device for producing high-purity nano molybdenum trioxide according to claim 1, wherein a compressed air port (9) is formed at a lower side of the subliming furnace (7).

8. The device for producing high-purity nano molybdenum trioxide according to claim 1, wherein a peephole (3) is formed in a side wall of the subliming furnace (7) and is in the same horizontal line together with the first vent tube (24).

\* \* \* \* \*